Nov. 5, 1935.  R. J. WINSOR  2,020,271
ROAD WORKING MACHINE
Filed April 7, 1923
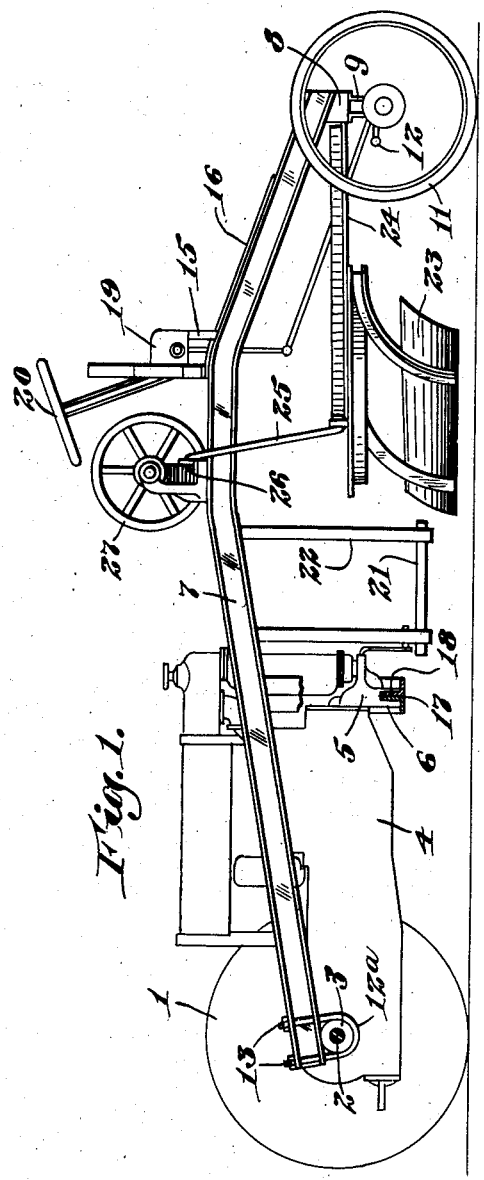
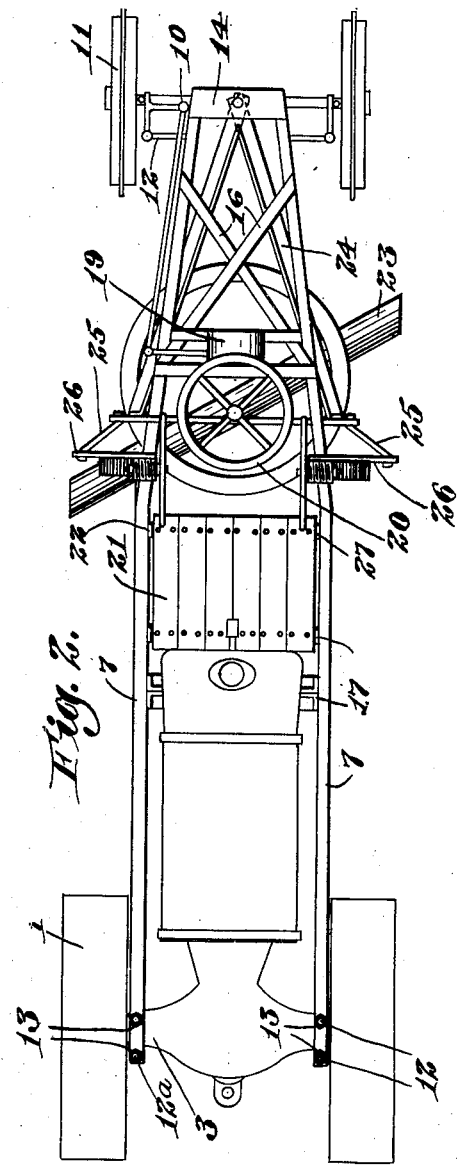

Patented Nov. 5, 1935

2,020,271

UNITED STATES PATENT OFFICE 2,020,271

ROAD WORKING MACHINE

Roy J. Winsor, Bucyrus, Ohio

Application April 7, 1923, Serial No. 630,498

31 Claims. (Cl. 37—156)

My present invention relates to a novel and improved road-working implement which may be assembled by bringing together a power-traction unit of an ordinary standard type of tractor comprising a body carrying a motor, suitable transmission and driving axle to which traction means are connected, and a suitable framework provided with steerable wheels and a road working implement, such framework being connected to such power traction element in a manner to constrain rotation of the power-traction element with respect to the frame about a horizontal axis.

In carrying out my invention I am enabled to utilize any of the well known types of tractors, "Fordson" tractors, "Cletracs", Holt or "Caterpillar" tractors, or the like, which are built in quantity production and are adapted originally as pulling vehicles and stationary power plants. By means of my invention I provide suitable attachments to apply to such tractors, to convert them into relatively lengthened vehicles, with the original power traction units as pushing elements, and with steering or guide wheels sufficiently spaced from the propelling mechanism so as to carry between the front wheels and the power plant and suspended from the framework, road working implements, such as road grading devices. An important advantage and feature of this construction consists in the fact that a machine is thus provided, utilizing a standard type of power plane and engine and driving construction, together with a very simple and economical attaching frame. Furthermore, an advantageous feature consists in the fact that these attaching frames can be readily shipped and assembled at distant points, in ordinary garages or by usual farm labor.

In carrying out my invention I can convert a standard type of tractor into an efficient operating machine by providing a framework suitable for speedy attachment, in a merely nominal space of time and without the slightest machine work or the like. Thus in converting a "Fordson", for example, I provide a set of side frames adapted to be attached directly to the rear axle, which frames extend forwardly and upwardly a sufficient distance to provide length and height to swing the desired road-working implements under the frame, said frame having a pivoted forward truck to which the original tractor wheels can be applied if desired. Thus the operation of converting a tractor into a machine of the type described, consists simply in detaching the front wheels, attaching the same to the forward truck of the framework, and clamping, bolting or otherwise securing the rear ends of the side frames about the rear axles of the tractor driving mechanism—a matter of but a few moments and capable of consummation without skilled labor, independent of machine shops, boring, fitting or other expert operation. Thus a pulling tractor is almost instantly converted into a road machine, wherein the power plant becomes the pushing element for the completed converted machine.

In my previously issued Patent No. 1,669,364, I have claimed a somewhat similar structure but limited to a crawler type tractor and a connection of the frame structure to the tractor in a manner to permit relative movement of the tractor with respect to the frame structure about a horizontal axis.

A preferred embodiment of the invention is shown in the accompanying drawing, in which Fig. 1 is a side elevation of a tractor equipped with the attachment—one of the rear wheels being removed to show the means for engaging the rear wheel axle housing; and Fig. 2 is a plan view of the structure shown in Fig. 1.

While the invention is applicable to various types of tractors, the one shown in the illustration is that commonly known as a "Fordson". In this type of tractor, a pair of rear driving wheels 1 are provided, which have a rear axle 2, and a rear axle housing 3, formed as a unitary portion of the main body 4 of the tractor. The front end of the tractor is usually provided with a bracket 5, having downwardly extending lugs 6 adapted to receive, between them, the front wheel axle.

In the practice of this invention, a pair of upwardly arched channeled side frame members 7 are provided, which at their front end, are equipped with a bracket 8, having downwardly extending spaced lugs 9. The front axle 10 of the tractor is detached, and is positioned between these lugs. The front wheels 11 with their steering mechanism 12, are left intact and are bodily removed with the front axle and positioned as described. The upwardly arched side members 7 extend rearwardly and downwardly to a point above the rear axle housing 3. A U-shaped tie bolt 12ª is provided for each side member, and is positioned beneath and around the housing 3, passed through suitable apertures in the side frame member, and secured in position by a pair of nuts 13, as may be seen from Fig. 1. These side frame members may be joined at their front end by means of a bracing member 14, and may be joined intermediate their ends by transverse bracing members 15, and diagonal bracing members 16, as may be seen from Fig. 2. An underslung substantially U-shaped yoke 17 is secured between the side frame members. This yoke is preferably formed of a pair of angle-irons with their flanges secured together and extending inwardly to provide a web 18. This web, as may be seen from Fig. 1, is secured between the downwardly extending lugs 6, which originally pivotally held the front axle 10.

The steering mechanism is removed from the front portion of the tractor power plant, and is attached to the front portion of the frame so that it occupies the position indicated at 19 with the hand wheel 20, extending upwardly and slightly rearwardly. An operator's support 21 is mounted beneath the upwardly arched side frame members, and supported therefrom by downwardly extending supporting arms, or yokes, 22.

This type of tractor is eminently adapted to carry a road working tool between the front wheels 11 and the engine body 4. This tool may be of any desired type, and in the form shown is a scraper or grader blade 23. This scraper or grader blade is carried upon divergent arms 24, whose rear ends are adjustably carried by links 25. These links have their upper ends secured to arms 26 elevated through reduction mechanism, such reduction mechanism being, in turn, operated by hand wheels 27.

It will be seen that a tractor has been provided in which wide spacing between front and rear wheels is secured, in which a very strong frame work structure is provided, which, due to the upward arching of the side members 7, adequately resists the distortional or bending stresses, and which provides room for scrapers, or other road working tools.

It will also be seen that an attachment has been provided which may be applied to the usual type of tractor, which is adapted to utilize the portions of the ordinary tractor and cooperate with such portions to provide a machine capable of severe and extended uses, such as road grading work on highways. Furthermore the process of building a machine of this type by the very simple method of converting any one of several standard types of tractors on the market by means of a suitable frame to space the forward supporting and steering wheels, and of sufficient height to carry the implements desired, making these as an attachment to the original tractor power plant, converting same into a pushing power element, while still preserving its usefulness as a pulling vehicle, is novel with me.

My invention is further described and defined in the form of claims as follows:

1. A road working machine comprising front steering wheels and rear driving wheels widely spaced, axles therefor, a pair of upwardly arched channeled side frame members spanning the gap between said wheels and supported on the axles on which said wheels are mounted, an engine for driving said rear wheels and located in front of, and closely adjacent to, said wheels, a supporting yoke for the engine passing beneath the forward end of said engine and carried by said side frame members, an operator's support secured to and hung downwardly between said side frame members, a working implement carried between the front wheels and the engine and mounted beneath said side frame members and control mechanism for the working implement and the steering wheels located in front of the operator's support and on the side frame members.

2. The combination with the power traction unit of a tractor, of a frame attached to said power unit and extending in front thereof, a steering wheel unit applied to the front portion of said extended frame, a road-working implement connected to said frame and working at the rear of said steering wheel unit but ahead of said power unit, and means for raising, lowering and angularly adjusting said road-working implement.

3. The combination with a tractor, of a frame secured to and extending forwardly from the tractor, a wheeled support for the forward end of the frame, a grader blade adjustably carried by the frame rearwardly of the support, an operator's station, and controls extending from said wheeled support and from said grader blade to within reach of the operator at said station.

4. The combination with a tractor, of a frame secured to and extending forwardly from the tractor, a steerable support for the forward end of the frame, a grader blade adjustably carried by the frame, an operator's station, and controls extending from said steerable support and from said grader blade to within reach of the operator at said station, said frame being attached to the tractor in such a manner as to permit the weight of the frame and grader to lend additional traction to the tractor wheels.

5. The combination in a road grading machine, of a tractor having rearwardly arranged traction wheels, a frame secured to the tractor and extending forwardly thereof, steering wheels supporting the front end of the frame, a grader blade carried by said frame and arranged to operate rearwardly of the steering wheels and forwardly of the tractor, an operator's station, and controls extending from the steering wheels and from said grader blade to within reach of an operator at said station.

6. The combination in a road grading machine, of a tractor having rearwardly arranged traction wheels, a frame secured to the tractor and extending forwardly thereof, steering wheels supporting the front end of the frame, a grader blade carried by said frame and arranged to operate rearwardly of the steering wheels and forwardly of the tractor, an operator's station, and controls extending to within reach of an operator at said station for controlling the steering wheels.

7. The combination in a road grading machine, of a tractor having rearwardly arranged traction wheels, a frame secured to the tractor and extending forwardly thereof, steering wheels supporting the front end of the frame, a grader blade carried by said frame and arranged to operate rearwardly of the steering wheels and forwardly of the tractor, said tractor and frame being connected in such a manner as to permit the tractor weight to assist in the grading operation and to permit the weight of the frame and grader to lend additional traction to the traction wheels.

8. The combination with a tractor, of a frame attached to the tractor and extending in front thereof, a steering wheel unit applied to and supporting the front portion of said extended frame, a road grading tool connected to said frame and working at the rear of said steering wheel unit but ahead of said power unit, and means for raising, lowering and angularly adjusting said road grading tool.

9. The combination with a tractor, of a frame attached to the tractor and extending in front thereof, a steering wheel unit applied to and supporting the front portion of said extended frame, a road grading tool connected to said frame and working at the rear of said steering wheel unit but ahead of said power unit, and controls, extending to within reach of the tractor operator, for raising, lowering and angularly adjusting said road grading tool.

10. The combination with a tractor, of a frame attached to the tractor and extending in front thereof, a steering wheel unit applied to and supporting the front portion of said extended frame, a road grading tool connected to said frame and working at the rear of said steering wheel unit but ahead of said power unit, and controls, extending to within reach of the tractor operator, for raising, lowering and angularly adjusting said road grading tool, and for steering said steering wheel unit.

11. In a road working machine, the combination with a frame, of a wheeled support connected thereto, a unitary power plant connected to said frame, traction means driven by said power plant and supporting one end thereof independently of said frame, the other end of said power plant being supported by said frame between said wheeled support and said traction means and confined against substantial up and down motion with respect to said frame, road working means operatively carried by said frame between said wheeled support and said traction means, and operator's station, and means for controlling said road working means from said operator's station.

12. In a road working machine, the combination with power traction mechanism comprising ground engaging traction devices operatively connected to a power plant engine through an axle housing located rearwardly of the main body of the power plant engine, of a vehicle frame comprising spaced-apart continuous, longitudinal side members connected to said engine and said axle housing, a steering wheel unit at one end of said frame, a grader blade adjustably mounted on said frame between the steering wheel unit and said traction devices, an operator's station, and means for adjusting said grader blade from said station and also operating said steering wheel unit from said station.

13. The combination with a tractor power plant, of a wheeled support for said power plant and spaced therefrom, a frame comprising continuous, longitudinal, spaced side members extending between and connecting said tractor power plant and said wheeled support at a point behind the front end of said tractor power plant, a support for the front end of the power plant carried by said spaced side members and connected in supporting relation to the front end of said tractor power plant and centrally thereof, a road working implement operatively carried by said side members rearwardly of said wheeled support, an operator's station, means operable from said station for adjusting said road working implement, and traction devices supporting the rear end of the power plant and driven thereby.

14. In combination, a steering unit, a frame comprising continuous, longitudinal, spaced side members connected to and extending from said steering unit, a power plant having opposite sides thereof connected to said side members, a road working implement adjustably suspended from said side members and located behind said steering unit, a central support for the front end portion of said power plant, the same being connected to said side members in fixed relation thereto, traction devices connected to and driven by said power plant and co-acting with said central support to connect the power plant to said frame, an operator's station, and means for controlling said road working means from said operator's station.

15. In a road working machine, the combination with a vehicle frame comprising spaced-apart side members, of a steering wheel unit at one end of said frame, a power traction unit comprising a rear axle housing formed as a unitary portion of the main body of the unit, mechanism for connecting said power traction unit to said frame with the main body of the unit located between said spaced-apart side members, a road working implement mounted on said frame rearwardly of the front end of said frame, means for controlling said road working implements, and means for operating said steering wheel unit both while said power traction unit moves the machine along the roadway.

16. The combination with power traction machanism comprising a rear axle housing and ground engaging traction devices operatively connected through said housing to an internal combustion engine, of a frame mounted on said traction devices and extending forwardly in advance thereof, a steering wheel unit at the front portion of said extended frame, a road working implement connected to said frame and adapted to work at the rear of said steering wheel unit, a supporting connection between said internal combustion engine and said frame, means for controlling said road working implement, and means for operating said steering wheel unit both during the operation of said power traction mechanism.

17. In a road working machine, the combination with a power plant comprising an engine and driving mechanism of standard tractor type of construction, of traction devices connected to said driving mechanism, said driving mechanism comprising a rear axle housing, a vehicle frame means for supporting the rear end portion of said frame on said rear axle housing a supporting device depending from said frame intermediate the ends thereof in position to support the front end of said power plant a steering wheel unit acting as a support for the front end of said frame, an operator's station intermediate the ends of said frame, road working instrumentalities operatively associated with said frame, and means operable from said station for controlling the steering wheel unit and controlling operation of the road working instrumentalities.

18. In a road working machine, the combination with a power traction unit comprising traction devices operatively connected to an engine, of a vehicle frame associated with said power traction unit for support by said traction devices, a steering wheel unit supporting the front end of said frame, a road working implement adjustably mounted on said frame rearwardly of said steering wheel unit, an operator's station comprising a platform secured to and downwardly depending from said frame intermediate the ends thereof, and means operable from said station for controlling said steering wheel unit and controlling operation of the road working implement.

19. In a road working machine, the combination with a relatively long upwardly arched vehicle frame comprising spaced-apart side members, of a power traction unit comprising spaced-apart ground engaging traction devices operatively connected to an engine, connections between the said frame and said power traction unit to effect support of the rear end portion of said frame on said traction devices, a steering wheel unit at the front end of said frame, a road working implement rearwardly of the steering wheel unit and forwardly of the power traction unit and under the upwardly arched portion of the frame, an operator's station in advance of the power traction unit on said frame, and means for controlling the operation of said steering wheel unit and said road working implement from said station.

20. The combination, with a tractor power plant, of a steering wheel unit, a frame comprising continuous longitudinal spaced side members adjacent to the sides of said power plant and connected to and extending between said tractor power plant and said steering wheel unit, a road working implement depending from and supported by said side members and located between said power plant and said steering wheel unit, means for supporting the forward central portion of the power plant, an operator's station, means operable from said station for adjusting said road working implement and for operating said steering wheel unit, and traction devices associated with said frame and connected to said power plant to be driven thereby.

21. In a road working machine, the combination with a relatively long vehicle frame comprising upwardly arched spaced-apart beams, of a power plant engine from an ordinary tractor of standard type of construction connected to said frame, ground engaging traction mechanism connected to said power plant to be driven thereby, mechanism comprising a cross-piece secured intermediate its ends to the front central portion of said power plant engine, a steering wheel unit for one end of said frame, a road working implement suspended from said spaced-apart beams between one end of said power plant engine and said steering wheel unit, an operator's station, and means operable from said station for adjusting said road working implement and operating said steering wheel unit while said power plant is driving said traction mechanism.

22. In a road working machine, the combination with power traction mechanism comprising ground engaging traction devices operatively connected to a power plant engine through an axle housing, of a vehicle frame comprising spaced-apart continuous, longitudinal side members having portions thereof continuous, longitudinal side members having portions thereof associated with the axle housing to secure support thereof by said ground engaging traction devices, a supporting connection between said engine and said frame side members, a steering wheel unit at one end of said frame, a grader blade adjustably mounted on said frame between the steering wheel unit and the traction devices, an operator's station, and means for adjusting said grader blade from said station and also operating said steering wheel unit from said station.

23. In a road working machine, the combination with a vehicle frame, of a supporting steering wheel unit, a power plant connected to the rear end portion of said frame, traction mechanism connected to said power plant to be driven thereby, mechanism comprising a frame having depending members intermediate the ends of said vehicle frame and having a transverse cross-piece connected intermediate its ends to the lower central front portion of said power plant, a road working implement carried by said frame between one end of said power plant and said steering wheel unit, an operator's station, and means for adjusting said road working implement and operating said steering wheel unit from said station.

24. In a road grading machine, the combination with a relatively long vehicle frame comprising spaced-apart continuous, longitudinal side members, of a steering wheel unit at one end of said frame, a grader blade adjustably suspended from said side members intermediate the ends of said frame, an engine, mechanism for mounting said engine on said frame between said side members, traction devices widely spaced from the steering wheel unit with the grader blade located between said steering wheel unit and said traction devices, power transmitting connections between said engine and said traction devices comprising an axle housing associated with said traction devices, connections between said side members and said housing whereby a portion of said frame is supported by said traction devices, the other portion being supported by said steering wheel unit, an operator's station rearwardly of the grader blade, and means operable from said station for adjusting said grader blade and steering the machine.

25. In a road working machine, the combination with a vehicle frame comprising upwardly arched spaced side members connected together at their forward ends, of a power plant of the commercial tractor type and comprising a rear axle housing, traction mechanism connected to said power plant to be driven thereby, spaced-apart connections between the rear ends of said side members and said housing, mechanism comprising a U-shaped support connected to and extending between said side members intermediate the ends of said frame for supporting the front central portion of said power plant, a steering wheel unit for the front end of said vehicle frame, a grader blade adjustably suspended from said side members between the front end of said power plant and said steering wheel unit, an operator's station, and means for effecting adjustment of said grader blade and the operation of said steering wheel unit while the machine is being moved along a roadway by means of said power operated traction mechanism.

26. In a road working machine, the combination with a tractor power plant engine, of traction devices, driving mechanism between said tractor power plant engine and said traction devices and comprising a rear axle housing, a vehicle frame comprising spaced-apart side members connected at their rear end portions to said housing and extending forwardly along opposite sides of said tractor power plant engine to a position widely spaced from the front end of said power plant, a steering wheel unit supporting the front end of said vehicle frame, a road working implement carried by said vehicle frame by being suspended from said side members for location between the front end of said power plant and said steering wheel unit, mechanism connected between said side members of said frame intermediate the ends of the latter and adjacent to the front end of the power plant for supporting the front central portion of the power plant, said power plant having, in cooperation with the spaced connections with the rear end of the frame, a three-point support on the frame, an operator's station, and means for controlling the operation of the road working implement and the operation of the steering wheel unit.

27. In a road grader, the combination with power traction mechanism comprising rear spaced-apart ground engaging traction devices operatively connected to an engine through a laterally projecting axle housing, of an upwardly arched framework with its front end widely spaced from the traction devices and comprising spaced-apart continuous, longitudinal side members extending along the sides of the engine closely adjacent thereto, a supporting connection between said engine and said frame side members, means for supporting the rear end portions of said side members on the laterally projecting end portions of said housing, a front steering wheel unit, a grader blade adjustably suspended from the upwardly arched portions of said frame between the front steering wheel unit and said rear traction devices, an operator's station located rearwardly of the grader blade, and means for controlling the operation of the road grader blade and the operation of the steering wheel unit.

28. In a power road grading machine, the combination with a relatively long vehicle frame comprising spaced-apart side members continuously longitudinal from the front end of the machine to the rear end thereof, of a power plant engine from an ordinary tractor of standard type of construction connected to said frame, ground engaging traction devices connected to said power plant engine to be driven thereby, a supporting connection between said engine and said frame side members, a steering wheel unit for one end of said frame, an elongated grader blade adjustably suspended from said spaced-apart side members between said steering wheel unit and said traction devices to occupy a diagonally extending position transversely of said side members and spaced below the same at the road surface, an operator's station, and means for controlling the operation of the grader blade and the operation of the steering wheel unit.

29. In a power road grading machine, the combination with a relatively long vehicle frame continuously longitudinal from the front end of the machine to the rear end thereof and comprising side frame members, of a power plant engine, ground engaging traction devices connected to said power plant engine to be driven thereby, a holding connection between the forward portion of said power plant engine and said frame to hold the power plant engine in fixed relation to said frame, spaced-apart supporting connections between said side frame members and said traction devices, steering wheel mechanism for supporting one end portion of said frame, the other end portion being supported by said traction devices and the steering wheel mechanism being widely spaced from said traction devices, an elongated grader blade adjustably suspended from said frame between the steering wheel mechanism an said traction devices to occupy a diagonally extending position transversely of said frame and spaced below the same at the road surface, an operator's station, and means for controlling the operation of the grader blade and the operation of the steering wheel mechanism from the operator's station, said traction devices serving to support that portion of said frame connected thereto and said traction devices coacting with said holding connection to support the power plant engine in fixed relation to said frame.

30. In a power operated road machine, the combination with a relatively long vehicle frame continuously longitudinal from the front end of the machine to the rear end thereof and comprising symmetrically arranged spaced-apart side members, of a power traction unit at the rear end portion of said frame and comprising an internal combustion engine connected by power transmission mechanism to ground engaging traction devices, a road working implement adjustably mounted on said frame beyond the front end of said engine in position to operate on material along the path of travel of the machine, steering mechanism at the front end of said frame spaced forwardly from said power traction unit, mechanism connected to said spaced-apart side members in position to hold the forward end of said power traction unit in fixed relation to said frame independently of said steering mechanism, the said power traction unit being otherwise solely supported by said ground engaging traction devices, supporting connections between the rear end portions of said side members and said ground engaging devices separately from the engine to afford support of the frame solely by said steering mechanism and said traction devices, an operator's station, and means operable from said station for adjusting said working implement and actuating said steering mechanism during movement of the machine along the roadway by means of said power traction unit.

31. In a power operated road machine, the combination with a relatively long vehicle frame comprising spaced-apart elongated symmetrically arranged side members, of a power traction unit at one end portion of said frame and comprising an engine connected by power transmission mechanism to ground engaging devices, a steering wheel unit at the other end portion of said frame, a road working implement adjustably mounted on said frame in position to operate on material along the path of travel of the machine, mechanism between the said spaced-apart side members and the forward central portion of said power traction unit to hold the latter in fixed relation to said frame independently of said steering wheel unit, the power traction unit being otherwise supported solely by said ground engaging traction devices, spaced-apart supporting connections between the said spaced side members and said ground engaging traction devices to afford support of said frame solely by said traction devices and said steering wheel unit and provide connections at three spaced points between the frame and the power traction unit, an operator's station, and means operable from said operator's station for adjusting the working implement and actuating said steering wheel unit during movement of the machine along the roadway by means of said traction unit.

ROY J. WINSOR.

CERTIFICATE OF CORRECTION.

Patent No. 2,020,271. November 5, 1935.

ROY J. WINSOR.

It is hereby certified that error appears in the printed specification of the above numbered patent requiring correction as follows: Page 1, first column, line 31, for "plane" read plant; page 3, first column, line 31, claim 11, for "and" first occurrence, read an; second column, lines 44 and 46, claim 17, after "housing" insert a comma; line 45, same claim, after "frame" insert a comma; line 49, same claim, after "plant" insert a comma; and line 49-50, same claim, for "stering" read steering; page 4, first column, line 16, claim 20, after "continuous" insert a comma; and lines 54 and 55, claim 22, strike out the words "continuous, longitudinal side members having portions thereof"; page 5, first column, line 66, claim 29, for "an" read and; and that the said Letters Patent should be read with these corrections therein that the same may conform to the record of the case in the Patent Office.

Signed and sealed this 28th day of April, A. D. 1936.

Leslie Frazer (Seal) Acting Commissioner of Patents.